(12) United States Patent
Tesmar et al.

(10) Patent No.: US 8,804,237 B2
(45) Date of Patent: Aug. 12, 2014

(54) SIGHTING TELESCOPE WITH HIGH SHOOTING RELIABILITY UNDER DIFFERENT CONDITIONS

(75) Inventors: Manuela Tesmar, Rosbach v. d. Hoehe (DE); Helke Karen Hesse, Giessen (DE); Christoph Hilmar vom Hagen, Giessen (DE)

(73) Assignee: Schmidt & Bender GmbH Co. KG, Biebertal (DE)

( * ) Notice: Subject to any disclaimer, the term of this patent is extended or adjusted under 35 U.S.C. 154(b) by 804 days.

(21) Appl. No.: 13/008,041

(22) Filed: Jan. 18, 2011

(65) Prior Publication Data

US 2011/0176207 A1 Jul. 21, 2011

(30) Foreign Application Priority Data

Jan. 19, 2010 (DE) .......................... 10 2010 005 122

(51) Int. Cl.
*G02B 23/00* (2006.01)
(52) U.S. Cl.
USPC ................................ 359/428; 42/123; 42/131
(58) Field of Classification Search
None
See application file for complete search history.

(56) References Cited

U.S. PATENT DOCUMENTS

| 3,672,782 | A | 6/1972 | Akin |
| 4,584,776 | A | 4/1986 | Shepherd |
| 6,583,862 | B1 * | 6/2003 | Perger .......................... 356/4.01 |
| 2005/0219690 | A1 * | 10/2005 | Lin et al. ...................... 359/429 |
| 2011/0017824 | A1 * | 1/2011 | Kaufmann .................... 235/404 |
| 2013/0318853 | A1 * | 12/2013 | Tesmar et al. .................. 42/123 |

FOREIGN PATENT DOCUMENTS

| DE | 93 12 604 | 1/1994 |
| DE | 299 03 989 | 6/1999 |
| DE | 10 2006 03577 | 2/2008 |
| DE | 20 2008 012601 | 11/2008 |

* cited by examiner

*Primary Examiner* — Arnel C Lavarias
(74) *Attorney, Agent, or Firm* — Clark & Brody

(57) ABSTRACT

A sighting telescope included a beam splitter which is slanted relative to an optic axis and is configured between an objective and an ocular, further a projection element to generate onto the beam splitter a target mark visible from the ocular, the projection element being fitted with a light source, further two image planes between the objective and the ocular, of which a first image plane is nearer the objective and a second image plane is nearer the ocular, and a reversal system configured between the image planes, a reticle being situated in the first image plane and the target mark in the second image plane.

10 Claims, 3 Drawing Sheets

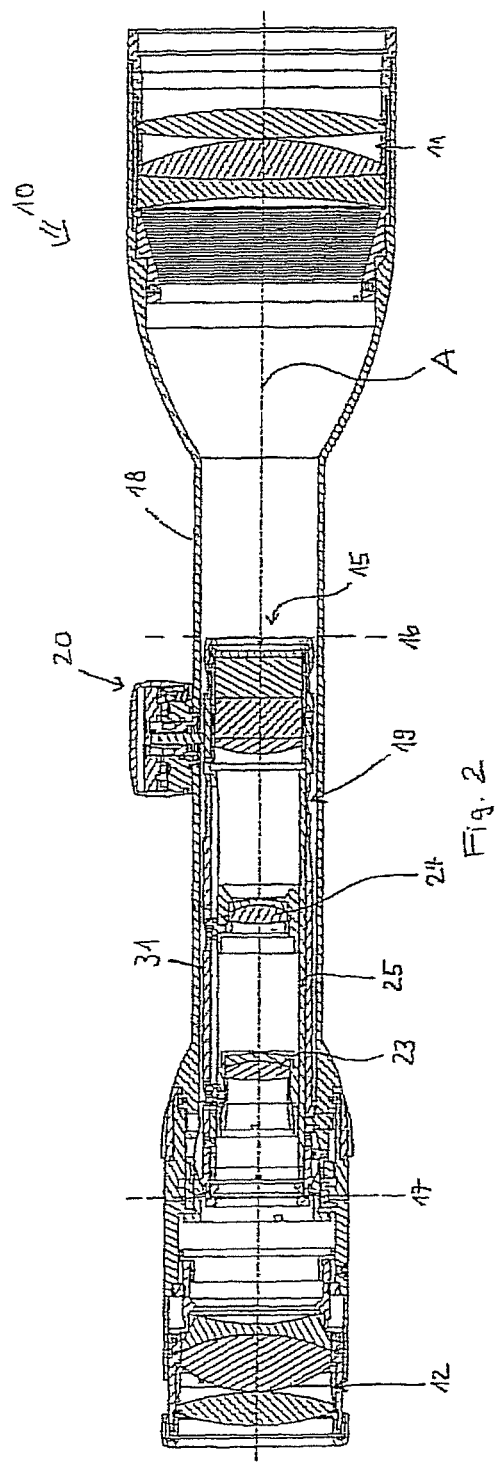

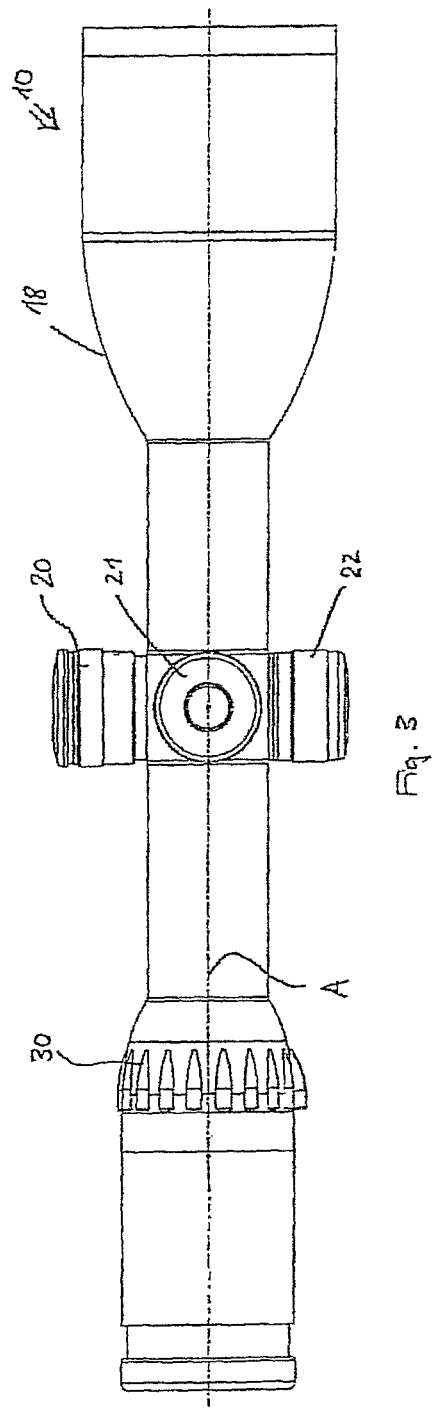

SIGHTING TELESCOPE WITH HIGH SHOOTING RELIABILITY UNDER DIFFERENT CONDITIONS

FIELD OF THE INVENTION

The present invention relates to a sighting telescope with high shooting reliability under different conditions.

BACKGROUND ART

Conventional sighting telescopes typically are fitted with one or more sighting accessories which are configured, depending on the design, in the first image plane near the objective and/or in the second image plane near the ocular of said telescope. Usually an optical reversal system is configured between the two image planes. On one hand, said reversal system is used to reverse the vertically and laterally inverted image. On the other hand, the reversal system is able to control the magnification of the telescope.

A number of different sighting accessories are known in the state of the art. One such accessory may be a reticle. Frequently a reticle is a crossed-lines grid made by etching or subtended by inserted wires, its structuring allowing a variety of patterns. A very popular design is the crosshairs. Besides such relatively plain geometries, more complex reticles also are known. Illustratively, their features may allow improving the distance-to-target determination. Illuminating means are frequently used to discern the reticle on the target image even under poor light conditions or at dusk Another kind of sighting accessory is described in the German patent document DE 299 03 989 U1. This document discloses a sighting telescope comprising a beam splitter which is configured between a system ocular and objective lens and slants with respect to an optic axis, further a projection element to generate a target mark visible from the ocular, said projection element being fitted with a light source and the beam splitter together constituting one common unit displaceable as a whole. A dimmable and switchable light source may be also provided to match the target mark to the varying light conditions.

When the sighting accessory is situated in the sighting telescope's first image plane, that is in front of the reversal system, then, in the course of a change in magnification, said accessory is jointly magnified, respective reduced, with the target object. As a result the relation between sighting accessory and target object always remains constant regardless of the particular magnification. By means of the sighting accessory dimension relative to the target object it is possible to determine said object's distance. However, the drawback to this method is that at large magnifications, the sighting accessory masks a large portion of target object.

The sighting accessory is situated behind the reversal system when situated in the second image plane. A change in magnification entails only the size of the target object while the sighting accessory's dimensions always remain the same. Consequently this design of the sighting accessory cannot be used to determine the distance to the target.

German patent document DE 20 2008 012 601 U1 discloses a target optics with a first crosshairs image situated in a second image plane nearest the objective and a target dot reticle configured in a second image plane nearest the ocular. A switchable illumination element is provided for both reticles. Consequently, both reticles may be used jointly or independently of each other depending on the state of illumination.

By means of the above discussed disclosure, both the advantages of a reticle in the first image plane and that of a reticle in the second image plane are being used. However a significant drawback is incurred in that the target mark in the second image plane is fully visible even when the illuminating element has been shut off. As a result, the target image is at least partly masked. Masking the target image both distracts the marksman and lowers the reliability of hitting the target.

Based on this state of the art, it is the object of the present invention to create a sighting telescope offering substantial support to the marksman both for rapid fire, for instance in beater hunts, and for accurate long-range firing. Moreover the sighting telescope shall enable distance measurement.

SUMMARY OF THE INVENTION

The present invention stipulates that for a sighting telescope comprising a beam splitter, which is configured in the path of the beam between an objective and ocular and is slanted relative to an optic axis and fitted with a projection element to generate a target mark on the beam splitter and visible from the ocular, the projection element being fitted with a light source, two image planes being subtended between the objective and ocular, a first image plane being nearer the objective and a second image plane being nearer the ocular, an optic reversal system being configured between said image planes, a reticle shall be situated in the first image plane and the target mark in the second image plane.

Independently of the adjusted/set magnification, the reticle in the first image plane shall exhibit a constant magnification relative to the target object. Together with the set magnification, this constant relation can be used to determine the distance to the target. Accordingly, positioning the reticle in the first image plane provides a simple and economic means to determine the distance to the target. The reticle is constituted by an illuminated crosshairs formed by a crossed-lines grid.

In addition to the reticle in the first image plane, the sighting telescope also comprises a target mark in the second image plane. Where needed, e.g., a rapid shot, the target mark may be switched to near range. Moreover, large distances, respectively large magnifications, especially in a poor light environment, may entail that the reticle in the first image plane is hard to discern. In such conditions, the target mark makes it possible even then to fire a shot accurately. Accordingly the invention offers a sighting telescope assuring high shooting reliability under different conditions.

The second image plane is configured behind the reversal system which includes a magnification system of the sighting telescope. The target mark, being situated in the second image plane, will not be enlarged respectively reduced during a change in magnification, instead remaining constant. Consequently a fine target mark structure is assured across the full range of magnification. This feature is advantageous in particular with flat target mark patterns. Illustratively, dot-shaped target mark patterns can be detected by the human eye in an especially short time and without stressing accommodation and therefore such patterns are often desirable. However, such a pattern would mask a large part of the target image when magnifying the sighting accessory. Therefore, situating the target mark in the second image plane advantageously allows using the most diverse target mark patterns, the target mark boosting target sighting and not masking the target object even at large magnifications.

The likelihood of hitting the target object is exceedingly improved thereby, and also the use of the sighting telescope is made easier.

Advantageously, the target mark is emitted/irradiated by the projection element. Except for the beam splitter, all components to generate the target mark are configured outside the beam path. In the OFF state, the marksman only discerns the reticle configured in the first image plane. The design of the invention therefore provides a sighting telescope making use of the various advantages of the sighting accessories in the different image planes. When the target mark in the second image plane is not needed, it may be shut off, the marksman sensing no degradation of the target image.

In one preferred embodiment mode of the invention, the beam splitter is configured in the second image plane. Thereby a means is available to make the target mark visible in the second image plane.

Moreover the beam splitter preferably is a prism boundary surface slanting relative to the optic axis. This design allows simple and economical manufacture of the target mark. The beam splitter is an optical component enabling viewing from the ocular the projection element generated target mark.

The advantage of using a prism as beam splitter is that the incident from the objective—illustratively when compared with a semi-transmitting mirror—shall be hardly absorbed or reflected. Accordingly the target optics offers good target image quality even under poor viewing conditions.

In a further embodiment mode of the invention, the beam splitter is constituted by the directly abutting boundary surfaces of two prisms each slanting relative to the optic axis, said prisms being made of material of different indices of refraction. In addition to the stable design of the beam splitter, the contrast in the target mark also may be improved. By appropriately selecting the materials of different indices of refraction and the slanting angle of the mutually abutting prism surfaces, a means is provided allowing for instance reflecting only the red portion of the light emitted by the projection element toward the objective, the other wavelengths being transmitted. The target mark is superposed with the object image in the absence of interference.

Furthermore and preferably, part of the projection element shall be mounted on one of the prisms. This design makes it possible first to connect the components one to another and next to insert them jointly. Such a configuration is extremely compact and furthermore the manufacturing procedure is simplified by inserting a prefabricated sub-assembly.

In another embodiment mode, the projection element comprises a stop. Advantageously a stop fitted with a recess matching the particular shape of the target mark is an especially economical and simple means to generate different target mark patterns and sizes. In this manner a light dot or a crosshairs may be advantageously manufactured, for instance, as a target mark pattern.

In a preferred embodiment of the sighting telescope, said projection element is fitted with a battery. This battery assures a reliable power supply. Relatively compact batteries are commercially available, and as a result the optical geometry of the sighting telescope remains substantially unaffected. A replacement battery in the housing offers additional reliability.

In an especially preferred embodiment, a regulator is used for the light source. This feature is especially advantageous because the regulator matches the sighting telescope to the particular light conditions. Illustratively in good light conditions a very low light intensity of the target mark is selected. Thereby the target mark cannot swamp the incident target picture.

In an important embodiment mode of the invention, the target mark is a light dot. This target mark pattern offers good sighting support in particular for rapid firing. The central shot mark offers good detection within a short time interval because the target image is only minimally masked. Due to the little stress of accommodation, the light source is exceedingly useful even in extended operation.

Furthermore, the reticle is preferably fitted with a dimmable and/or switchable illumination element. In this design too, the permanently visible sighting accessories can be matched to the particular light conditions. This feature greatly improves the reliability of shooting and furthermore prevents early fatigue of marksman's eye under poor light conditions.

Further features, particulars and advantages of the present invention are defined by the wording of the claims and are explicit in and implicit from the discussions of the illustrative embodiments and in relation to the appended drawings.

BRIEF DESCRIPTION OF THE DRAWINGS

FIG. 2 shows a known sighting telescope in longitudinal section,
FIG. 3 shows a sideview of a known sighting telescope.

DETAILED DESCRIPTION OF THE INVENTION

Figure 1:
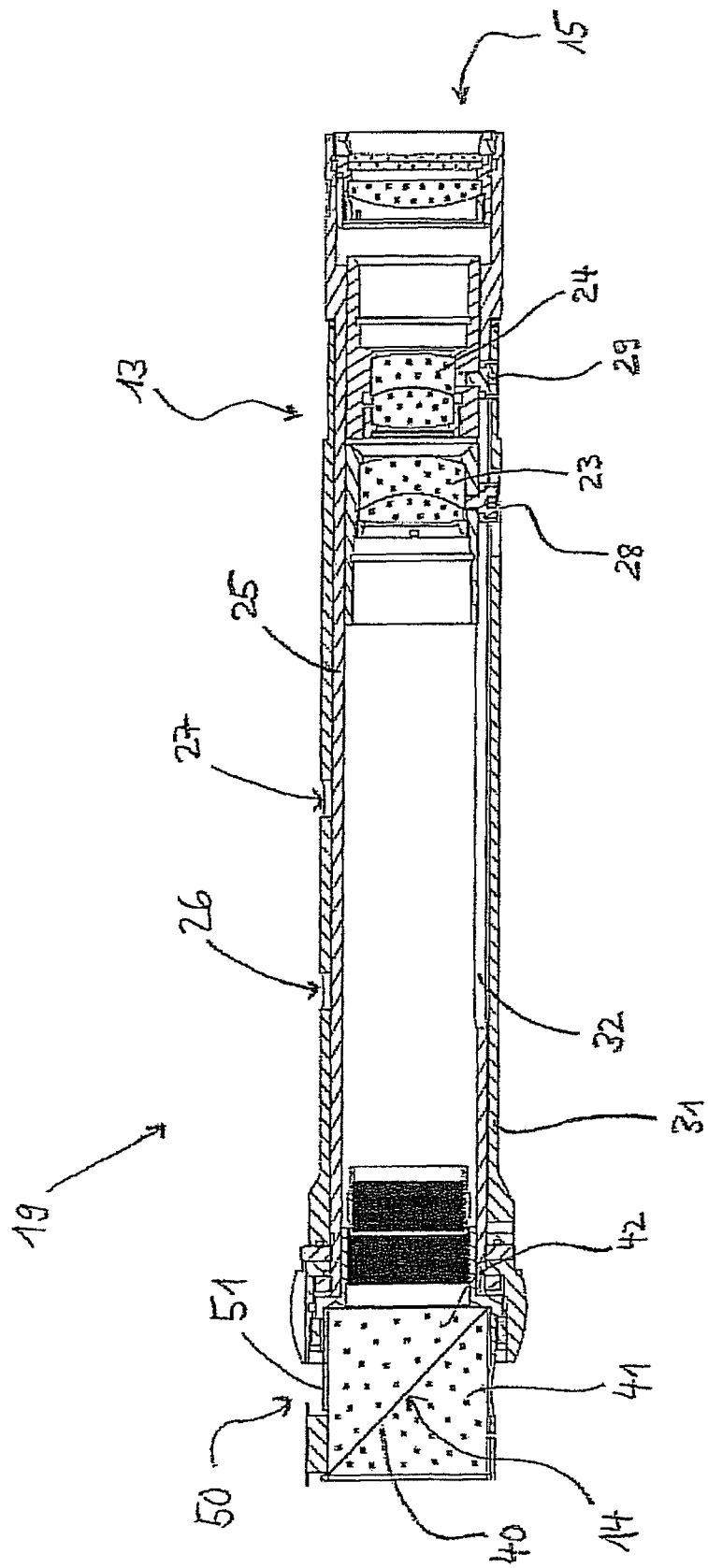
FIG. 1 shows an inner tube of a sighting telescope.

FIG. 2 shows a sighting telescope denoted overall by 10. This sighting tube 10 is known from the state of the art.

The longitudinal section of the sighting telescope 10 shows an outer tube 18 in which are configured an objective 11, an inner tube 19 and an ocular 12. The first image plane 16 and the second image plane 17 are situated between the objective 11 and the ocular 12. A reticle 15 is configured in the first image plane 16. The inner tube 19 is displaceably supported in a gimbal at its side facing the ocular 12. An adjustment turret 20 is affixed to the outer tube 18. The adjustment turret 20 is fitted with a means resting against the inner tube 19. The adjustment turret 20 allows adjusting the inner tube for instance to compensate for crosswinds. The inside tube 19 comprises a guide bush 25 in which are configured two reversing lens elements 23, 24 affixed in two mounts. The reversing lens elements 23, 24 are supported to be displaceable along the optic axis A.

The sideview of a sighting telescope 10 known from the state of the art shown in FIG. 3 comprises three adjustment turrets 20, 21 and 22 configured on an outer tube 18. An optic axis A is also shown. The sighting telescope 10 moreover is fitted with an adjustment system 30 to vary its magnification.

FIG. 1 shows the inner tube 19 of a sighting telescope 10. The inner tube 19 comprises a helical sleeve 31 fitted with two helical recesses 26, 27. The helical recesses 26, 27 preferably are slots. A guide bush 25 is configured in the helical sleeve 31. The guide bush 25 comprises a recess 32 preferably in the form of a longitudinal slot and running parallel to the longitudinal axis of the inner tube 19. A reversal system 13 is configured in the guide bush 25. The reversal system 13 comprises two reversal system lens elements 23, 24 held in mounts and displaceable by a respective drive pin 28, 29, each drive pin being supported in one of the helical recesses 26, 27 of the helical sleeve 31.

The inner tube 10 also comprises a beam splitter 40. This beam splitter is subtended by the directly mutually abutting boundary surfaces of two prisms 41, 42 that may be made of materials differing in their indices of refraction. A light source 51 in the form of a light emitting diode (LED) of a projection element 50 is configured on the prism 42. Other appropriate light sources than the said LED may also be used.

A target mark 14 may be generated on the beam splitter 40 by the projection element 50. In some circumstances the projection element 50 may be fitted with a stop configured between the light source 51 and the prism 42, said stop comprising a recess matching the target mark 14. The projection element 50 also is fitted with an omitted battery acting as its power supply and a dimmable/switchable regulator (also omitted). A reticle 15 is configured at that side of the inner tube 19 which is opposite the beam splitter 40. The reticle 15 may be a crossed-lines grid of which the pattern illustratively was made by etching or by inserting metal wires. Illustratively, the pattern may be crosshairs.

The present invention is not restricted to one of the above embodiment modes but on the contrary may be modified in versatile manner.

All features and advantages explicit in and implicit from the claims, specification and drawings, including design details, spatial configurations and procedural steps, may be construed as being inventive per se or in arbitrary combinations.

LIST OF REFERENCES

A optic axis
10 sighting telescope
11 objective
12 ocular
13 reversal system
14 target mark
15 reticle
16 first image plane
17 second image plane
18 outer tube
19 inner tube
20, 21, 22 adjustment turret
23, 24 reversal system lens element
25 guide bush
26, 27 helical recess
28, 29 drive pin
30 adjustment system
31 helical sleeve
32 recess
40 beam splitter
41, 42 prism
50 projection element
51 light source

The invention claimed is:

1. A sighting telescope (10) comprising an objective (11) and an ocular (12) configured in a beam path, further a beam splitter (40) slanting relative to an optic axis (A), a projection element (50) to generate a target mark (14) visible from the ocular (12) onto the beam splitter (40), said projection element being fitted with a light source (51), two image planes (16, 17) being configured between the objective (11) and the ocular (12), a first image plane (16) being situated nearer the objective (11) and a second image plane (17) being situated nearer the ocular, and a reversal system (13) being configured between the two image planes (16, 17), characterized in that a reticle (15) is configured in the first image plane (16) and the target mark (14) is configured in the second image plane (17).

2. Sighting telescope (10) as claimed in claim 1, characterized in that the beam splitter (40) is configured in the second image plane (17).

3. Sighting telescope (10) as claimed in claim 1, characterized in that the beam splitter (40) is a boundary surface of a prism (41), said boundary surface slanting relative to the optic axis (A).

4. Sighting telescope as claimed in claim 1, characterized in that the beam splitter is constituted by directly abutting boundary surfaces slanting relative to the optic axis (A) of two prisms (41, 42) which are made of materials of different indices of refraction.

5. Sighting telescope (10) as claimed in claim 1, characterized in that at least part of the projection element (50) is configured on one of the prisms (41, 42).

6. Sighting telescope (10) as claimed in claim 1, characterized in that the projection element (50) comprises a stop.

7. Sighting telescope (109) as claimed in claim 1, characterized in that the projection element (50) comprises a battery.

8. Sighting telescope (10) as claimed in claim 1, characterized in that one or both of a dimmable and a switchable regulator is used for the light source (51).

9. Sighting telescope (10) as claimed in claim 1, characterized in that the target mark (14) is a luminous dot.

10. Sighting telescope (10) as claimed in claim 1, characterized in that the reticle (15) is fitted with one or both of a dimmable and a switchable illumination element.

\* \* \* \* \*